United States Patent Office 3,195,031
Patented July 13, 1965

3,195,031
ROLLED FOIL CAPACITORS
Richard Anthony Fitch, Mortimer, and Vernon Thomas Seymour Howell, Newbury, England, assignors to United Kingdom Atomic Energy Authority, London, England
Filed May 14, 1962, Ser. No. 195,049
Claims priority, application Great Britain, May 18, 1961, 18,137/61
3 Claims. (Cl. 317—260)

This invention relates to electrical capacitors of the type comprising conductor and insulator foils wound together into a roll.

An object of the invention is to minimise internal burning and radial flashover upon repeated charging and discharging. The effect is particularly noticeable with low-inductance capacitors e.g. 10 $\mu$f., 10 kv. discharging in a circuit of total inductance of about 10 nh.

Internal burning and radial flashover manifest themselves as conductive tracks composed of charred insulator. Their effect is to lower the breakdown voltage of the capacitor to a very low level thereby making the capacitor substantially useless.

The invention consists in an electrical capacitor comprising conductor and insulator foils wound together into a roll, thereby forming two transmission lines, and means for discharging the capacitor in such a way as to produce electromagnetic waves simultaneously in both transmission lines from electrostatic fields within the said transmission lines so that there is no significant magnetic pressure difference between the transmission lines during discharge.

In a preferred embodiment of the invention the first connection is immediately opposite the second connection in a radial direction, and a conductive bridge is provided external to the roll, one side of which bridge is connected to a conductor foil at the same radial position as the first connection, passes in a radial direction across both the said transmission lines and is connected at its other end to the same conductor foil at a point immediately opposite the second connection.

While not wishing to be bound by any theory the inventors believe that the following discussion with reference to the accompanying drawings will assist in understanding the invention.

Figure 1:
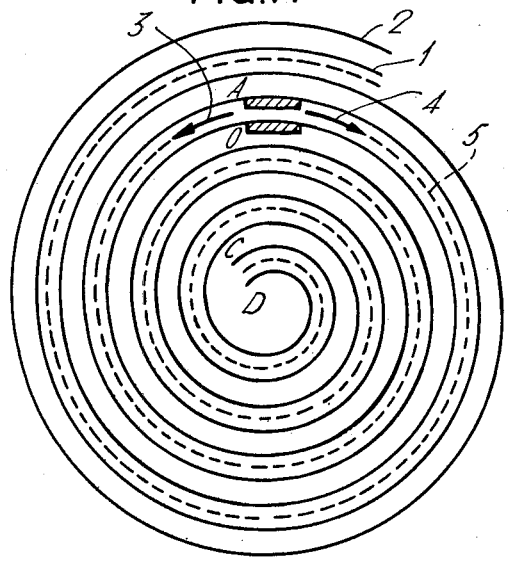
FIGURE 1 is an axial view of a rolled foil capacitor not embodying the invention.

In FIGURE 1 a rolled foil capacitor is composed of conductors 1 and 2 separated by an insulator which, for simplicity is not illustrated, it being clear that the space between the conductors 1 and 2 is filled with insulator. A tab A is in electrical contact with conductor 1 and a similar tab O is in electrical contact with conductor 2.

Figure 2:
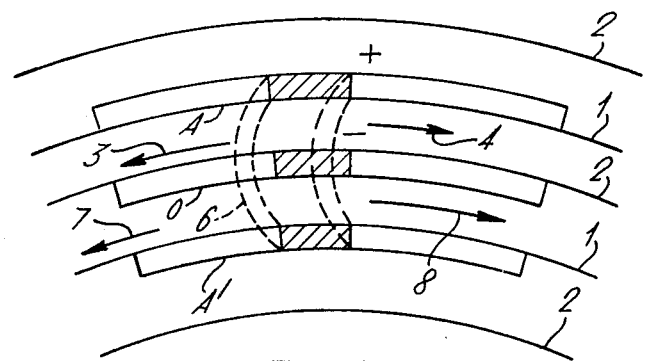
FIGURE 2 is an axial view of part of a rolled foil capacitor embodying the invention.
Figure 3:
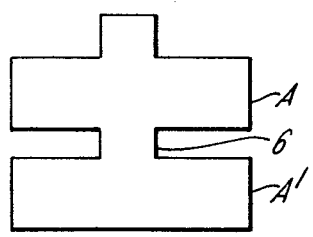
FIGURE 3 is a plan view of a tab.

In FIGURE 2 a tab A is in contact with a conductor 1 and is connected by a bridge 6 to another tab A¹ in contact with conductor 1 at a different point along the length of the conductor. A tab O is in electrical contact with a conductor 2. The space between the conductors is filled by an insulator which for simplicity is not illustrated.

Let us consider the capacitor shown in FIGURE 1. Let foil 1 be charged to a voltage V and let foil 2 be held at voltage zero. It is clear that along any radius of the roll there will be a set of series voltage vectors alternately opposed in direction. If a discharge is initiated by closing a switch of low impedance across tabs AO, two waves originate at the tabs and travel along the insulator in opposite directions indicated by arrows 3 and 4.

The path of the waves through the capacitor is shown by dotted line 4.

Following the waves we find that only half the capacitor is discharged during the time taken for the waves to travel through the insulator to the inner and outer ends of the roll. The capacitor can be regarded as two separate transmission lines only one of which is discharged by the connection of tabs A and O. The discharge wave is reflected at the open ends of the transmission line and travels back with the overall result that the voltage vector in that transmission is inverted. Therefore the set of series vectors alternately opposed is replaced by a set of series vectors having the same direction. This results in a large voltage difference appearing across the ends of foil 1. The voltage difference can be up to the charging voltage multiplied by twice the number of turns in the roll, this being due to losses and coupling into the undischarged line at the ends. It is clear that there is also a magnetic pressure difference between the two transmission lines. This difference applies a heavy impulsive force to the foils at the front of the advancing wave and either hurls them against the relatively immovable edges of the tab connections thereby producing tearing forces, or pulls them away thereby producing arcing. It is also possible that distortion of the foil can occur which would lead to flashover from the foil to the tab.

In FIGURE 2 closing of a switch of low impedance across tabs A and O produces waves in the insulator between tabs A and O and also in the insulator between A and O.

The directions of the waves are shown by arrows 3, 4, 7 and 8. In contrast to the case of the capacitor shown in FIGURE 1, both transmission lines forming the capacitor are discharged by closing of the switch, and there is no magnetic pressure difference between them.

It is apparent, however, that for no magnetic pressure difference to exist, the currents in the regions of the tab-foil boundaries should be balanced and hence be as uniform as possible in direction and amplitude. This condition will not exist if the tab-foil boundaries are immediately adjacent the discharge connections, where the current flow lines are curving from the foils out of the capacitor, and where the currents in portions A and A' are unequal. To ensure that these boundaries the currents are equal and the flow lines uniform and parallel to the length of the foils, the tabs are preferably given a winged configuration so that the boundaries are displaced along the foils away from the discharge connections, i.e. away from where the current flow lines start to become non-uniform. Of course, tab O must be winged in the same manner as tab AA' in order to obtain balanced conditions.

Mechanical effects due to magnetic pressure are not, however, entirely eliminated. The electrostatic attraction between the tabs A and O results in a negative pressure which is balanced by compressive stress in the dielectric. The negative pressure is suddenly converted to a positive pressure of magnetic repulsion. This is largely a balanced force tending to make the capacitor expand. Only at the inner and outer boundaries is there any relative movement. It may be desirable to provide means, e.g. a high density buffer to limit this movement.

We claim:

1. A rolled foil electrical capacitor comprising first and second conductor foils of opposite polarity and first and second dielectric foils, said conductor and dielectric foils being arranged alternately and wound into a roll in which the conductor foils are insulated from each other by the dielectric foils, first capacitor discharge terminal means in electrical contact with the first conductor foil, said electrical contact being made at two locations on the first conductor foil, which locations are spaced apart along the foil by a distance substantially equal to one turn of the winding of the roll with not more than two thicknesses of dielectric foil and one thickness of the second conductor foil lying between them, a second capacitor discharge terminal electrically connected at a single location to the second conductor foil, the said single location lying between the two contact locations on the first conductor foil.

2. A rolled foil electrical capacitor according to claim 1 wherein said first and second discharge terminal means are of foil configuration and extended at least to the outside of the roll.

3. A rolled foil electrical capacitor comprising first and second conductor foils of opposite polarity and first and second dielectric foils, said conductor and dielectric foils being arranged alternately and wound into a roll in which the conductor foils are insulated from each other by the dielectric foils, a first capacitor discharge terminal of foil configuration in electrical contact with the first conductor foil, said first capacitor discharge terminal having a portion within the roll and a portion extending out of the roll, the portion within the roll having a greater width than the portion extending out of the roll, the said electrical contact being made at two locations on the said conductor foil, which locations are spaced apart along the foil by a distance substantially equal to one turn of the winding of the roll with not more than two thicknesses of dielectric foil and one thickness of the second conductor foil lying between them, a second capacitor discharge terminal electrically connected at a single location to the second conductor foil, the said single location lying between the two locations on the first conductor foil, said second capacitor discharge terminal also having a portion within the roll and a portion extending out of the roll, the portion within the roll having a greater width than the portion extending out of the roll.

References Cited by the Examiner
FOREIGN PATENTS

| | | |
|---|---|---|
| 351,366 | 6/31 | Great Britain. |
| 398,624 | 9/33 | Great Britain. |
| 848,440 | 9/60 | Great Britain. |

JOHN F. BURNS, *Primary Examiner.*

DARRELL. L. CLAY, *Examiner.*